Patented Mar. 10, 1936

2,033,740

UNITED STATES PATENT OFFICE 2,033,740

ESTERS OF PHENYLCARBAMIC ACID

Theodore H. Rider, Cincinnati, Ohio

No Drawing. Application August 10, 1931,
Serial No. 556,332

6 Claims. (Cl. 260—43)

My invention relates to the production of the hydrochlorides of gamma-dialkyl amino-n-propyl alcohol esters of aromatic carbamic acids which possess the general formula:

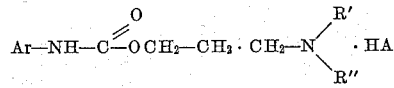

in which R' and R'' represent alkyl radicals which may be either alike or different or which may both be constituents of a ring in which the nitrogen to which they are attached is also included (such as the piperidine ring) in which Ar represents an aromatic group, and in which .HA represents any acid either organic or inorganic.

*General method of synthesizing compounds of this series*

Phenyl isocyanate (or other aromatic or substituted aromatic isocyanate or one of the corresponding carbamyl chlorides) is added to an equal molecular quantity of a dialkyl amino propyl alcohol in ether as a solvent. The mixture is heated for a short time to insure completion of the reaction after which the hydrochloride of the ester is precipitated by passing dry gaseous hydrogen chloride into the reaction mixture. The ether is decanted and the insoluble product is dissolved in a hot mixture of acetone and ethyl acetate which on cooling precipitates the desired hydrochloride which possesses anesthetic properties.

*Specific compound in this series*

6.3 g. of phenyl isocyanate are added to 10 g. of gamma-di-n-butyl amino propyl alcohol in 100 cc. of anhydrous ether, and the solution boiled for two hours. At this point the ester formation is complete and the product exists in solution with the probable formula

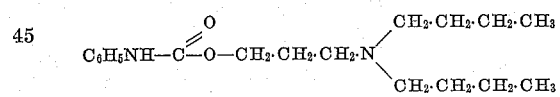

After this it is cooled and saturated with dry gaseous hydrogen chloride. The ether is decanted and the insoluble product dissolved in a hot mixture of acetone and ethyl acetate which on cooling precipitates the hydrochloride of the phenyl urethane of gamma-di-n-butylamino propyl alcohol as white crystals which melt at 123–124° C. This compound has the probable formula

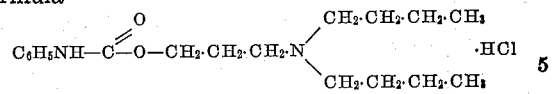

This product possesses anesthetic properties, and may be obtained as the salt of other acids both inorganic and organic, various other products of kindred properties being described in literature, in which particularly see "Phenylurethano Anesthetics", Journal of The American Chemical Society, volume 52, page 2583, (1930).

What is claimed is:

1. A compound of the general series

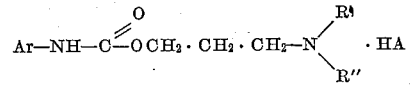

in which R' and R'' represent alkyl radicals or in which R' and R'' together represent a pentamethylene chain both ends of which are attached to N, in which Ar represents a radical of the benzene series, and in which .HA represents a highly ionized mineral acid.

2. A compound of the general series

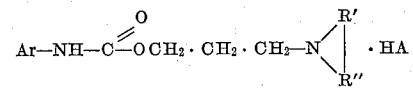

in which R' and R'' together represent a pentamethylene chain both ends of which are attached to N, in which Ar represents a radical of the benzene series, and in which .HA represents a highly ionized mineral acid.

3. The hydrochloride of an aromatic urethane of a gamma-di alkyl amino propyl alcohol possessing the general formula

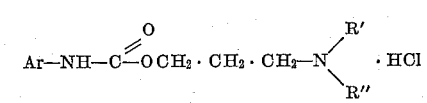

in which R' and R'' represent alkyl radicals in which Ar represents a radical of the benzene series.

4. The hydrochloride of an aromatic urethane of a gamma-di alkyl amino propyl alcohol possessing the general formula

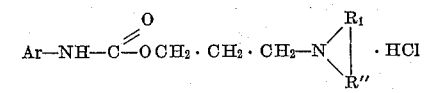

in which R' and R'' together represent a pentamethylene chain both ends of which are attached to N and in which Ar represents a radical of the benzene series.

5. The hydrochloride of the phenyl urethane of gamma-di-n-butyl amino propyl alcohol, which is a white crystalline solid melting at 123–124° C. having the probable formula

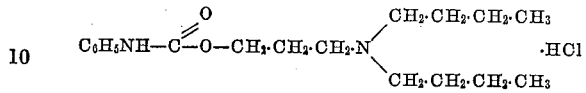

6. A compound of the general series

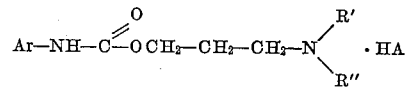

in which R' and R'' represent different alkyl radicals, in which Ar represents a radical of the benzene series, and in which .HA represents a highly ionized mineral acid.

THEODORE H. RIDER.